US011181118B2

(12) United States Patent
Fessel

(10) Patent No.: US 11,181,118 B2
(45) Date of Patent: Nov. 23, 2021

(54) METHOD FOR CONTROLLING FANS AND A GROUP OF FANS

(71) Applicant: ebm-papst Mulfingen GmbH & Co. KG, Mulfingen (DE)

(72) Inventor: Andreas Fessel, Weikersheim (DE)

(73) Assignee: ebm-papst Mulfingen GmbH & Co. KG, Mulfingen (DE)

(*) Notice: Subject to any disclaimer, the term of this patent is extended or adjusted under 35 U.S.C. 154(b) by 139 days.

(21) Appl. No.: 16/252,591

(22) Filed: Jan. 19, 2019

(65) Prior Publication Data

US 2019/0154045 A1 May 23, 2019

Related U.S. Application Data

(63) Continuation of application No. PCT/EP2017/067734, filed on Jul. 13, 2017.

(30) Foreign Application Priority Data

Jul. 21, 2016 (DE) .................... 10 2016 113 496.1

(51) Int. Cl.
*F04D 27/00* (2006.01)
*F04D 25/16* (2006.01)
(Continued)

(52) U.S. Cl.
CPC .......... *F04D 27/004* (2013.01); *F04D 25/06* (2013.01); *F04D 25/08* (2013.01); *F04D 25/166* (2013.01); *F04D 27/00* (2013.01); *F04D 27/005* (2013.01)

(58) Field of Classification Search
None
See application file for complete search history.

(56) References Cited

U.S. PATENT DOCUMENTS

| 5,492,082 A | 2/1996 | Krevinghaus et al. |
| 6,791,836 B2 * | 9/2004 | Cipolla .................. G09G 5/008 361/679.48 |

(Continued)

FOREIGN PATENT DOCUMENTS

| DE | 08017758 T1 | 9/2009 |
| DE | 202016103978 U1 | 8/2016 |
| WO | WO-2015/058354 A1 | 4/2015 |

OTHER PUBLICATIONS

International Search Report and Written Opinion (in German) dated Oct. 10, 2017.

(Continued)

*Primary Examiner* — Michael Lebentritt
*Assistant Examiner* — Jason G Davis
(74) *Attorney, Agent, or Firm* — Harness, Dickey & Pierce, P.L.C.

(57) ABSTRACT

A method for controlling a fan group in order to generate a predefined total volumetric flow. The group of fans has a plurality of individual fans operated in parallel. Each generates an individual volumetric flow. The group of fans is divided into at least a first and a second control group. Each group has at least one fan. The individual volumetric flow of at least one fan of the first control group is increased by adjusting into a range of optimum efficiency by a speed change. This maintains constant flow. The individual volumetric flow of at least one fan of the second control group is reduced accordingly by a rotational speed reduction. All the fans contribute to the total volume flow at all times and no fan of the second control group will be switched off at any time.

12 Claims, 1 Drawing Sheet

(51) Int. Cl.
F04D 25/06 (2006.01)
F04D 25/08 (2006.01)

(56) References Cited

U.S. PATENT DOCUMENTS

| | | | |
|---|---|---|---|
| 9,395,771 | B1 * | 7/2016 | Germagian .............. F24F 11/30 |
| 9,820,409 | B1 * | 11/2017 | Ross .................. H05K 7/20736 |
| 2004/0130868 | A1 | 7/2004 | Schwartz et al. |
| 2009/0038564 | A1 | 2/2009 | Gandrud et al. |
| 2010/0311318 | A1 | 12/2010 | Hause et al. |
| 2015/0030469 | A1 | 1/2015 | Hopkins et al. |

OTHER PUBLICATIONS

German Search Report dated May 24, 2017 in corresponding Application No. 10 2016 113 496.1.

* cited by examiner

METHOD FOR CONTROLLING FANS AND A GROUP OF FANS

CROSS-REFERENCE TO RELATED APPLICATIONS

This application is a continuation of International Application No. PCT/EP2017/067734, filed Jul. 13, 2017, which claims priority to German Application No. 10 2016 113 496.1, filed Jul. 21, 2016. The disclosures of the above applications are incorporating herein by reference.

FIELD

The disclosure relates to a method for controlling fans in order to generate a predefined total volumetric flow, as well as controlling the group of fans.

BACKGROUND

The purpose of using fan groups with a plurality of individual fans for generating a total volumetric flow is usually to replace large fans. The large fans are relatively inflexible in terms of adapting the volumetric flow. Moreover, fan groups are advantageous when operated within a duct network with constantly changing pressure conditions. Thus, the total supplied volumetric flow is adaptable. Such groups of fans operated in parallel are generally referred to in the art as "fan arrays," "fan walls" or "fan grids."

When the fans operate within a range of optimum efficiency, it was found in practice, when using the fan modules, that the required predefined total volumetric flow during operation is generally lower than the sum of the individual volumetric flows of all the fans of the fan module operated in parallel.

This means that the fans are operated within their performance map on the left and hence below optimum efficiency. The result is an undesirably low overall efficiency for the group of fans.

SUMMARY

It is thus an object of the disclosure to provide a method for controlling the group of fans, wherein the efficiency of the overall fan-group system may be improved without the need to perform additional structural measures on individual fans within the group of fans. Furthermore, the aim is to provide a correspondingly improved fan group.

Other advantageous developments of the disclosure will be understood in greater detail below together with the description of the preferred design of the disclosure in reference to the figures.

DRAWINGS

Figure 1:
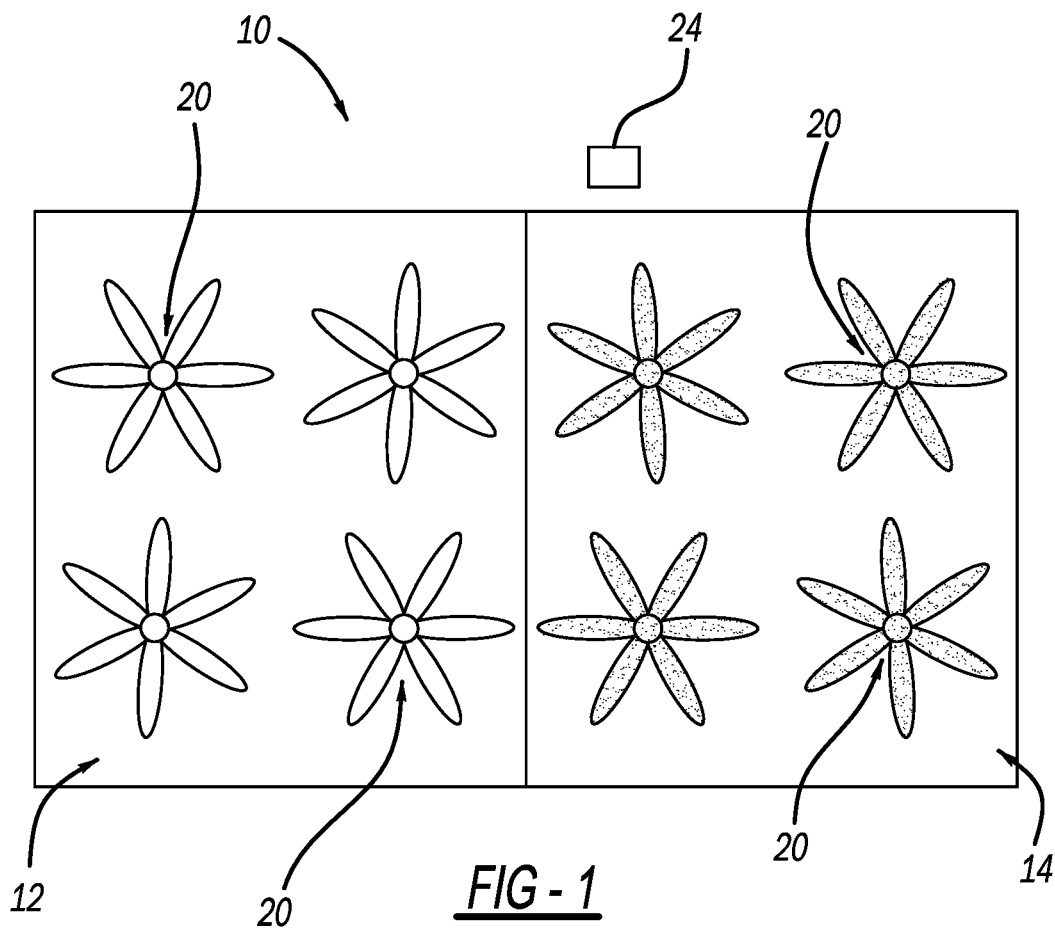
Figure 2:
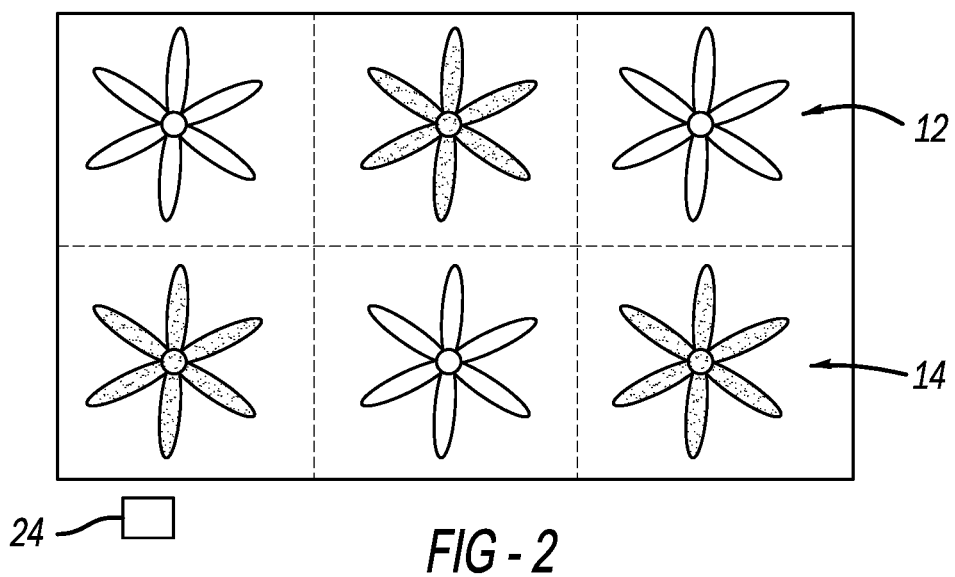

FIG. 1 is a schematic view of a group of fans.
FIG. 2 is a schematic view of a group of fans.

DETAILED DESCRIPTION

According to the disclosure, a method for controlling a fan group in order to generate a predefined total volumetric flow is proposed. The group of fans 10 include a plurality of individual fans operated in parallel. Each fan generates an adjustable individual volumetric flow. The group of fans 10 is divided into at least a first 12 and a second 14 control group. Each control group comprising at least one fan. While in effect maintaining a constant total volumetric flow, the individual volumetric flow of at least one fan of the first control group is increased by an adjustment into a range of optimum efficiency, via a rotational speed change. The individual volumetric flow of at least one fan of the second control group 14 is reduced accordingly, via a rotational speed reduction. It is intended that all the fans of the first 12 and second 14 control groups contribute to the total volumetric flow at all times. Thus, no fan of the second control group will be switched off at any time.

The at least one first control group is adjusted within its maximum power consumption for optimal efficiency. Thus, the energy balance of the overall system of the group of fans is optimized.

The adaptable individual volumetric flow is preferably realized under the same pressure increase.

In addition, by switching off the individual fans in the second control group, a reduction in the partial volumetric flow would be achievable. This is compensated for by increasing the partial volumetric flow and operating the fans in the first control group closer to or even at optimum efficiency. However, structural measures would have to be taken for the fans to be switched off so as to prevent backflow of the delivered air.

For example, flaps could prevent such a backflow. The additional design effort, however, is substantial and cost-increasing.

An advantageous embodiment is where the at least first and second control groups each have at least one fan. Also, a plurality of fans can be provided. This increases the variability and adaptability of the system.

The control method according to the disclosure enables the fans of the first control group to be operated with greater power output and closer to or even at optimum efficiency. The power output of the fans of the at least second control group is reduced accordingly. The total volumetric flow remains constant. Increasing the power of the fans of the first control group has a more positive effect on the efficiency of the overall system of the group of fans than reducing the power of at least the second control group. Thus, the overall efficiency of the group of fans is improved. An advantageous embodiment provides that at least some of the fans of the first control group are operated at optimum efficiency.

The total deliverable volumetric flow of the group of fans is variable and adaptable to the application requirements. However, adapting the total volumetric flow to the improved efficiency range assumes a constant total volumetric flow at one operating point. The individual volumetric flows of the first and at least the second control group are adapted for the corresponding operating point.

A further development of the method provides that, assuming the fans of the second control group operate at optimum efficiency, a change in the value of the total volumetric flow is effected by a speed change of the fans of the first control group to bring them closer to their optimum operating point.

In order to determine the optimization potential in terms of efficiency and the individual volumetric flows of the parallel-operated fans of all the control groups adding up to the total volume, the operating point of the individual fans or control groups is determined. Thus, an embodiment is provided where a partial volumetric flow of each of the at least first and second control groups is detected and transmitted to the controller.

This is done in one embodiment by continuously determining the operating points of all the fans of the at least first and second control groups and their transmission to the control system. The operating points are derived from the volumetric flow rate (m³/h) and pressure (Pa), the aerodynamic efficiency in percent, the input power (Watt) of the respective fan, and the relative power consumption in relation to the delivered air volume (W/m³/h). In a first embodiment, the data is transferred via a data bus.

An alternative embodiment provides that the operating points are calculated based on these parameters. Their determination is done without sensors.

Alternatively, it is provided in one embodiment that the operating points are determined by a volume-flow measurement by pressure sensors 20 arranged on the fans. Thus, the operating points are determined from parameters that include a pressure increase as a function of the volumetric flow measured by the pressure sensors as a function of the rotational speed of the respective fan.

In a development of the method, the acquired operating points are checked by comparing with a control value supplied by an internal power detection provided in the respective fan. A corridor is defined around the control values. Thus, deviations within the corridor need not result in an adjustment of the fan speeds. The size of the corridor may be adapted to the application of the group of fans and may take into account the accuracy requirements for the required total volumetric flow.

One advantageous embodiment of the method further provides that the individual volumetric flow of at least one or the plurality of fans of the first control group is increased by adjusting the continuous rotational speed variation into the range of optimum efficiency. The individual volumetric flow of at least one or the plurality of fans of the second control group is reduced accordingly by a continuous speed reduction. The continuous adaptation of the rotational speeds of all the fans allows for setting the preset total volumetric flow.

In one embodiment of the method, the control system 24 sets all the fans of the first control group to an identical initial rotational speed. All the fans of the second control group are set to an identical second rotational speed. As for volume delivery, the control groups behave in relation to one another in a complimentary fashion. They are able to complement one another in order to create the required total volumetric flow.

Alternatively, it is provided that the control regulates individually the rotational speed of each fan of the first and second control groups. Moreover, in an overall context, the control groups behave in a complementary fashion relative to one another, however, the rotational speeds of the individual fans are individually adjustable.

In addition to the control method, the disclosure also includes the group of fans for generating the predefined total volumetric flow. The group of fans include a multiplicity of individual fans operated in parallel. Each fan generates a single volumetric flow. The group of fans is divided into at least a first and a second control group. Each group comprises at least one fan. The individual volumetric flow of the at least one fan of the first control group may be increased by an adjustment into a range of optimum efficiency by changing the rotational speed, while in effect maintaining a constant total volumetric flow. The individual volumetric flow of the at least one fan of the second control group may be reduced accordingly by reducing the rotational speed. The group of fans is designed such that all fans of the first and second control groups contribute to the total volume flow at all times.

In an alternative embodiment, the group of fans, multiplicity of individual fans operated in parallel, are adjustable by one control. The fans of all the control groups are connected to the control system via a data bus.

It is, furthermore, advantageous that the plurality of individual fans may be operated in parallel and controlled individually via the control system.

One embodiment of the group of fans provides that the large number of individual fans operated in parallel is identical. It is alternatively provided that the fans deliver at least partially different power outputs and thus different maximum individual volumetric flows. By using fans with a lower power output, cost savings can be achieved for the entire group of fans.

As for overall performance, in an advantageous embodiment the group of fans, plurality of individual fans operated in parallel to one another, is arranged in a checkerboard pattern, i.e., a grid shape (see FIG. 2). The individual fans are spaced laterally in all four directions, such as in an array of 2×2, 3×3, 4×4, 1×2, 2×3, 3×4, 1×3, 2×4, 3×5 fans per fan group. The total number is arbitrary and can be adapted to the intended use, the desired power output and installation space.

Furthermore, it is advantageous if the plurality of individual fans operated in parallel is accommodated in a single mounting unit. Thus, all the fans are oriented in a predetermined flow direction relative to the mounting unit. For example, a frame construction or a shelf-structure type may be used as a fastening unit.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for controlling a group of fans in order to generate a predefined total volumetric flow, the group of fans comprising:
   a plurality of individual fans operated in parallel, each fan generating an individual volumetric flow, the group of fans is divided into at least a first control group and a second control group, each control group comprising at least one fan, and
   the individual volumetric flow of the at least one fan of the first control group is increased by an adjustment into fan optimum efficiency by a change in rotational speed of the individual fans, and
   the individual volumetric flow of the at least one fan of the second control group is reduced accordingly by a reduction in rotational speed of the individual fans, all the fans of the first control group and second control group making a contribution to the overall volumetric flow at all times while in effect maintaining a constant overall volumetric flow.

2. The method according to claim 1 wherein the at least first control group is adjusted to its highest power consumption into its efficiency optimum, such that an energy balance of the group of fans is optimized.

3. The method according to claim 1, wherein the at least first control group and the at least second control group each have a plurality of fans.

4. The method according to claim 1, wherein a partial volumetric flow of each of the at least first control group and the at least second control group is detected and transmitted to a control system.

5. The method according to claim 1, wherein the individual volumetric flow of the at least one fan of the first control group is increased by adjusting by means of a continuous change in rotational speed into the optimum efficiency, and the individual volumetric flow of the at least one fan of the at least second control group is reduced correspondingly by a continuous reduction in rotational speed.

6. The method according to claim 1, wherein a control system adjusts all the fans of the first control group to an identical first rotational speed and all the fans of the at least second control group to an identical second rotational speed.

7. The method according to claim 1, wherein a control system individually adjusts a rotational speed of each fan of the first control group and the second control group.

8. A group of fans for generating a predefined total volumetric flow, the group of fans comprising:

a plurality of individual fans operated in parallel, each fan generating an individual volumetric flow, the group of fans is divided into at least a first control group and a second control group, each control group comprising at least one fan; and the individual volumetric flow of the at least one fan of the first control group is increased by adjusting into fan optimum efficiency by a change in rotational speed; and the individual volumetric flow of the at least one fan of the second control group is reduced accordingly by a reduction in rotational speed, the group of fans is designed such that all the fans of the first control group and the second control group are making a contribution to the overall volumetric flow at all times, while in effect maintaining a constant overall volumetric flow.

9. The fan group according to claim 8, wherein the plurality of individual fans operated in parallel via one control that is adjustable.

10. The fan group according to claim 8, wherein the plurality of individual fans operated in parallel may be controlled individually via a control system.

11. The fan group according to claim 8, wherein the plurality of individual fans operated in parallel is identical.

12. The fan group according to claim 8, wherein the plurality of individual fans operated in parallel to one another is arranged like a checkerboard.

* * * * *